Feb. 8, 1927.
F. G. BAUM
1,617,007
TRANSMISSION SYSTEM
Filed June 20, 1922   2 Sheets-Sheet 1
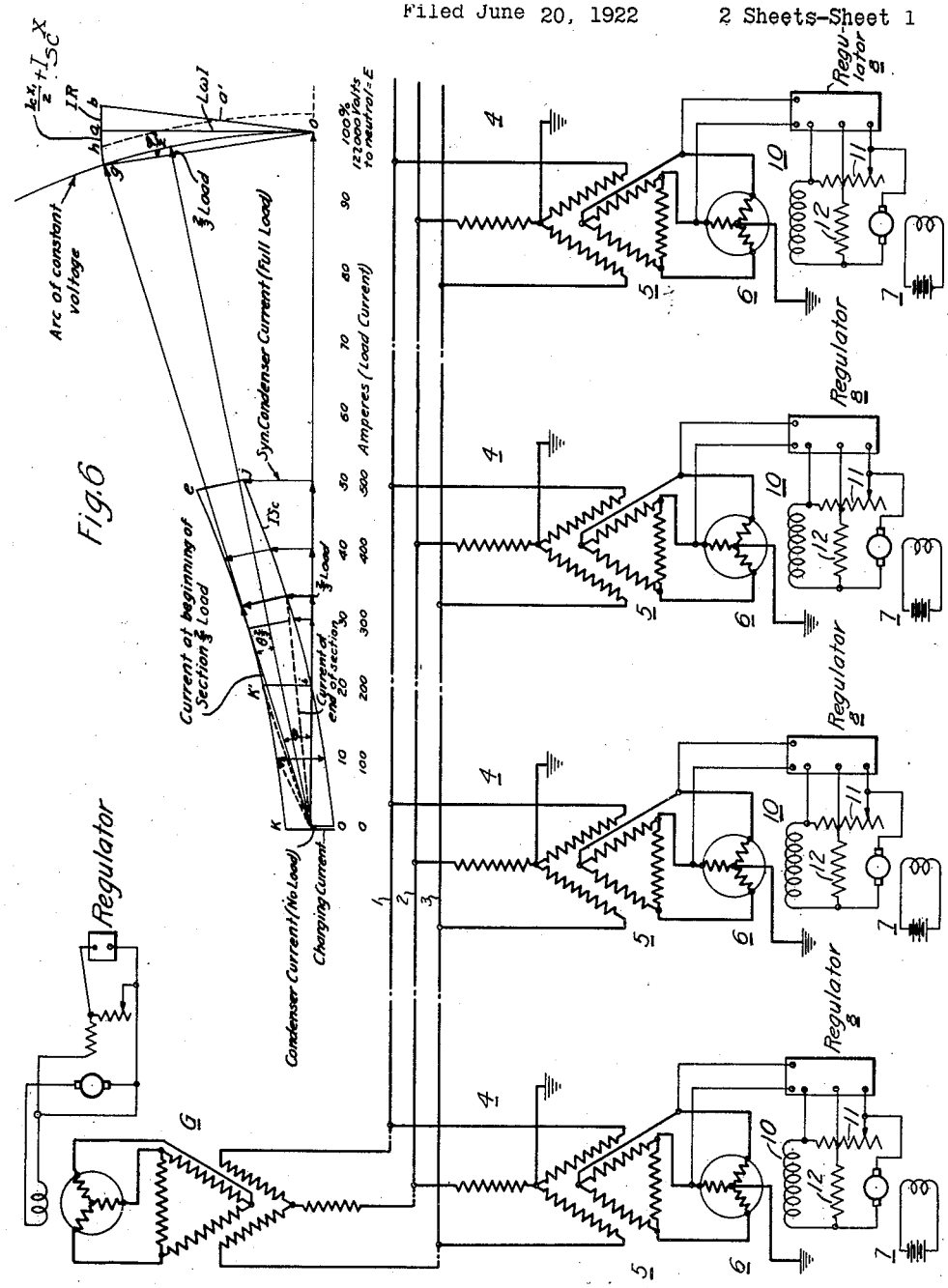
INVENTOR
Frank G. Baum
BY
Stockbridge Borst
ATTORNEYS

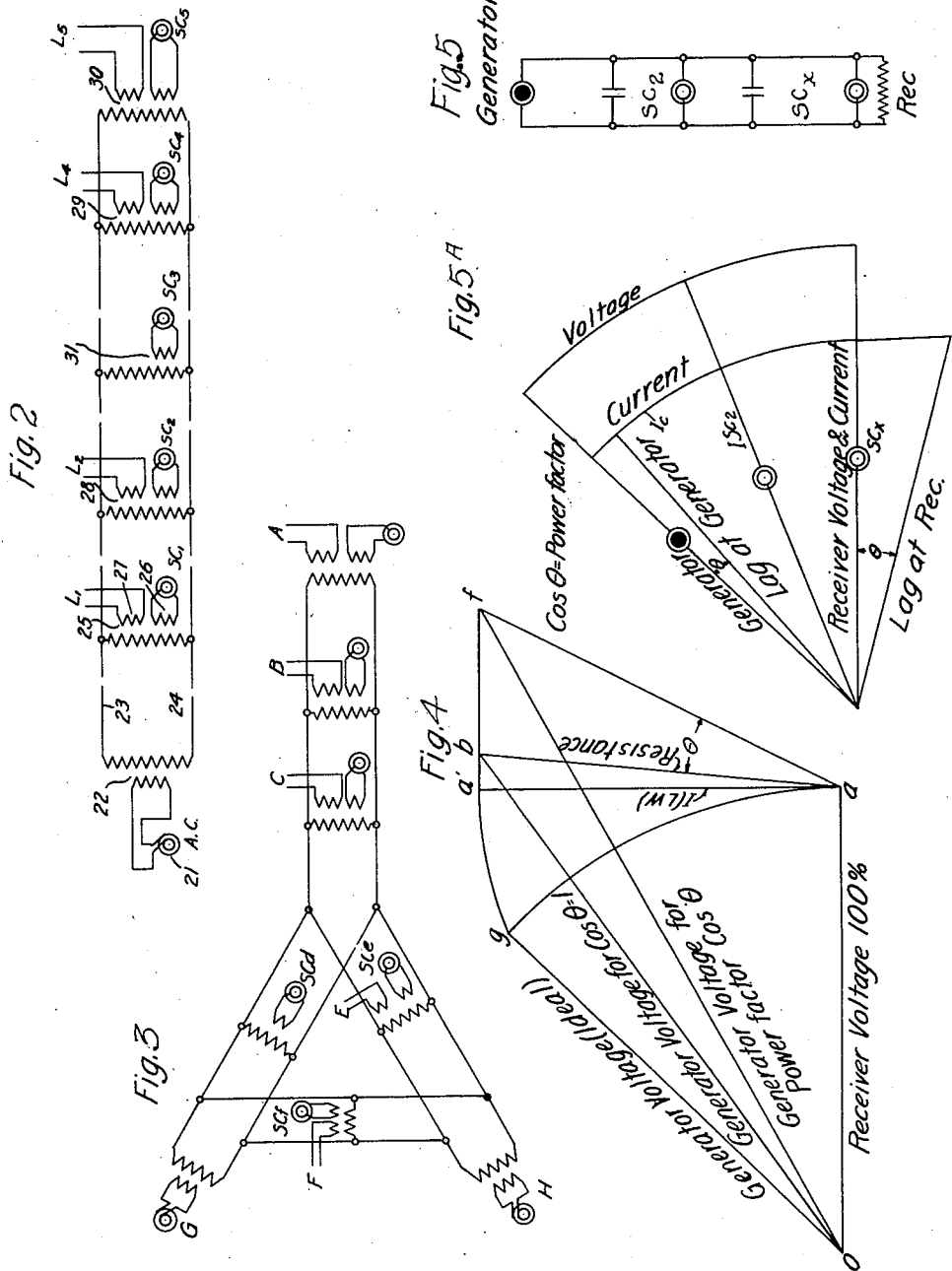

Patented Feb. 8, 1927.

1,617,007

UNITED STATES PATENT OFFICE.

FRANK G. BAUM, OF SAN FRANCISCO, CALIFORNIA, ASSIGNOR TO WESTINGHOUSE ELECTRIC AND MANUFACTURING COMPANY, A CORPORATION OF PENNSYLVANIA.

TRANSMISSION SYSTEM.

Application filed June 20, 1922. Serial No. 569,704.

My invention relates to electrical-power-transmission lines or systems, and particularly to those for the transmission of power at high voltages over long distances.

One object of my invention is to provide such a line or system and a method of operation thereof which will permit of transmitting power economically and efficiently over greater distances than has heretofore been practicable; in fact, over unlimted distances, and which, therefore, makes a transcontinental transmission system entirely feasible.

Another object of this invention is to provide a method of voltage regulation by which the current and voltage may be kept practically in phase and by which the voltage over the entire line may be kept practically constant for all loads.

A further object is to provide a high-voltage transmission system in which power may be taken from, or supplied to, the line at any point; in which the direction of power transmission over all or sections of the line may be reversed; in which practically constant voltage may be maintained for all conditions of load; in which the question of the natural periodicity of the line is eliminated; with which simpler and cheaper generators may be used; with which transformers may be standardized for one voltage; with which insulation strains may be reduced; with which the flow of power has the greatest possible flexibility; and which is simple, effective, practical and comparatively inexpensive.

Another object of my invention is the provision of regulation for a plurality of synchronous condensers that are uniformly spaced along the transmission line to maintain a substantially constant voltage at all points along the line by suitably over-exciting or under-exciting the field windings of the synchronous condensers in accordance with the requirements of the transmission system.

A further object of my invention is to provide a relatively long, relatively high-voltage transmission line comprising means for so loading the line as to insure characteristics of stability throughout the whole line under all operating conditions. In particular, no sudden or large increase in voltage is permitted, regardless of line surges or open circuits, by reason of the inherent operating characteristics of my system.

Another object of my invention is to provide a transmission system that will be practicable even if the wattless or reactive power of the transmission line itself, by reason of the length thereof, is comparable to the load or the power transmitted for useful work. Furthermore, the various synchronous condenser stations that are spaced along the transmission line are adapted to supply the wattless power taken by the line itself in addition to any voltage-correcting operation that may be performed by the synchronous condensers at load points in accordance with prior practice.

A further object of my invention is to provide a long-distance high-voltage power transmission line embodying means for so loading the line at intermediate points as to substantially eliminate the effect of the normal reactance of the line under all conditions of load. In other words, the losses that occur along the length of the transmission line are limited solely to resistance and leakage losses, whereby the various synchronous condensers may be of relatively small capacity, compared to the amount of useful power transmitted.

Another object of my invention is to provide a transmission line having a length constituting an appreciable fraction of the wave length corresponding to the frequency of the current traversing the line, together with means for so loading the line as to substantially eliminate the effect of the normal reactance thereof.

A further object of my invention is to provide a transmission line of the above-indicated character embodying means for varying the normal relative values of power-factors at the generator and the load ends of the line or, in other words, to materially reduce the normal difference in power-factors at the points mentioned.

Another object of my invention is to provide a system of transmission wherein the reactive power need not be transmitted through the line but is supplied at load or other points intermediate its ends.

A further object of my invention is to provide a system of transmission and distribution whereby it will be economical to supply power to sparesly settled districts for household and farming purposes, since suitable sub-stations will always be located near the load.

Another object of my invention is to provide a system of the above-indicated character including a plurality of capacitance devices, such as regulated synchronous condensers, connected to a transmission line of relatively great length at uniformly spaced points whereby, in effect, a plurality of relatively short transmission lines are produced which, although connected in series relation, individually possess characteristics, such as constant voltage, stability, etc., as outlined above, that correspond to the short transmission-line sections rather than to the characteristics of long transmission lines as previously understood.

Other objects of my invention will become evident from the following detailed description and are particularly set forth in the appended claims.

It will be understood that, generally speaking, the term "synchronous condenser" is illustrative of any load-correcting means, whether functioning as a capacity or an inductive load.

In the prior art, it has been proposed to use synchronous motors in connection with a low-voltage circuit supplying asynchronous motors, or other devices inherently having relatively low power-factors, in order to compensate to a certain extent for the lagging effect of the load current. It is well known that, by placing a synchronous motor in a low-voltage branch circuit at the point of energy consumption, that is, where a load is to be drawn from the line, the power-factor and the voltage of the low-voltage circuit may be maintained approximately constant. However, such arrangements as have heretofore been employed are not adapted to provide for the economical transmission of large amounts of power over long-distance high-voltage lines under stable conditions and to prevent excessive increases in voltage under light or no-load conditions.

It was proposed early in the art of low-voltage transmission systems to dispose synchronous motors in feeder circuits to the load. It is evident, in this case, also, that the principle of operation is not applicable to high-voltage long-distance transmission lines in order to supply the wattless current taken by the line itself and thus maintain the desired constant voltage, which I accomplish by the use of uniformly distributed corrective loading devices connected to the line itself.

In other words, by connecting a plurality of automatically regulated synchronous condensers to a relatively long transmission line at substantially uniformly spaced points and making such condensers of larger capacity than would be required for merely maintaining the voltage at the load point substantially constant, such increased capacity of the synchronous condensers may be employed for the purposes previously set forth, namely, to supply the reactive or wattless power taken by the line itself, thus limiting the line losses to resistance and leakage losses only. It will be seen that I thus contemplate an entirely different use of synchronous condensers and achieve a radically new result as compared with any of the teachings of the prior art. Viewed from one angle, therefore, it may be considered that my transmission line, taken as a whole, includes the synchronous condensers as an integral part thereof.

In a comprehensive system of super-power development, it is necessary to tie together various centers of distribution by means of transmission lines. It will be necessary to supply loads of varying values at intermediate points on a very long transmission line. A system which automatically provides a substantially constant potential throughout the line and is stable under all operating conditions would be ideal for such a system of super-power transmission network. A transmission line of several hundred miles in length and of relatively high voltage, such as 220,000 volts, would undergo, at no load, if no means were provided for maintaining the voltage at the desired value of 220,000 volts, a voltage rise of 30% to 40%, which would probably cause a flashover under certain conditions of moisture and dirt on the line insulators. Furthermore, it would be extremely difficult, if not impossible under such conditions to maintain proper regulation of the voltage at the receiving end.

By dividing the transmission line into relatively short sections, say 100-mile lengths, and supplying a corrective current, such as a charging current under light-load conditions, to the line from a synchronous condenser located at each of such points, a substantially constant potential is maintained throughout the length of the line, and power may be supplied or received at any of these points, while requiring only a minimum of additional generating or distributing apparatus.

One of the advantages in having a transmission line with a fixed potential over its entire length resides in the matter of stability under varying load conditions, as compared with the usual transmission line having the potential fixed only at the generating and the distributing points. For example, in a transmission line of several hundred miles in length, a synchronous-condenser station, in accordance with one form of my present invention, would be installed at every 100-mile point. In case the line is supplying a load at an intermediate point, as well as at its terminal, if the load at the intermediate point were suddenly thrown off, the synchronous condenser at the intermediate point would still be over-excited for the voltage formerly existing. However, the voltage at this point would not undergo any substantial rise in value, since the synchronous condensers in the aforesaid sections would become under-excited upon the occurrence of a relatively small increase in voltage, and they would thus inherently and immediately act as stabilizers to hold the potential down at those points, so that the limit to which the potential could rise at the load point in question would be the possible rise corresponding to only 100 miles of open-end transmission, which is a relatively small amount.

It will be seen that this stabilizing effect occurs irrespective of the total length of the transmission line, since the individual sections inherently act in the manner set forth, regardless of the distance from any generating station. The advantage of a system of this character in considering general networks in a super-power system will be evident. Thus, in considering the prospective joining of a neighboring center of distribution with a transmission line, it will no longer be necessary to consider the introduction of new synchronous condenser sub-stations. Such a station will be available on the transmission line at some relatively close point—possibly not much more than fifty miles distant, and the only problem will be one of possible addition to the condenser capacity of the station. Furthermore, when considering the supply of low-voltage power along the transmission line, it will be simply a matter of connecting to the low-voltage side of one of the synchronous condenser sub-stations and, as stated above, such a station will likely exist within a radius of fifty miles from the point of consumption.

It will thus be seen that the length of a transmission line constructed in accordance with the present invention is not limited or handicapped, as in the prior art, by the impossibility of transmitting power beyond a certain distance or by other inherent limitations in apparatus or line construction. On the other hand, the only matter to be considered in the extension of the transmission line to any desired point is the economics of such an extension, that is to say, whether or not there is sufficient demand for power along the proposed line of extension to make such an extension a profitable investment.

The proposed system is practically non-oscillatory, as far as the power circuits are concerned, and will, therefore, be practically free from transmission line surges. Moreover, since, at the end of each section, there will be a suitable ground on the transmission system, the natural oscillations of the system will be determined in accordance with the length of the short sections, namely 100 miles, instead of being dependent upon the length of the total transmission line.

The system is practically a number of short transmission systems connected in series relation and, therefore, if the first section of the transmission line is worked out so as to have the proper relations between the costs of the line losses and the interest on the investment, the same condition will hold on the successive sections, the transmission losses being reduced as the cost of power becomes increasingly higher with the length of transmission.

My transmission system has the characteristic of requiring a minimum of synchronous-condenser capacity or other corrective loading means for providing the desired voltage regulation and with respect to the transmission losses for a given voltage, and such capacity will also be a minimum for the transmission of a given amount of useful power. The relatively large number of condenser sub-stations is of great advantage in increasing the stability of the system as a whole, which makes for greater reliability in operation and renders the system capable of supplying small loads at the sub-stations with a relatively small or negligible increase in expense.

Heretofore, the distance to which electric power could be satisfactorily and successfully transmitted has been limited, and re-generation, retransformation, and direct-current schemes for increasing the distance over which transmission may be had, have not been satisfactory. In order to deliver a desired voltage at the receiving end of the line, it has heretofore been necessary that the voltage impressed upon the line at the generator end be increased, depending upon the load, distance, and power-factor. Since the voltage which can be safely handled at the generator end is limited, it follows that the distance over which successful transmission may be had is likewise limited unless some method of voltage regulation is possible largely independent of the generator voltage. If the distance for a given line be considered as a fairly constant factor and the load suddenly becomes lighter, the voltage on the line builds up proportionally and there is danger of the insulation breaking down under the increased strain. The lag of the current behind the voltage increases with the distance due to the line reactance and if the current lag becomes 90° the current and the voltage are opposed to each other, and a wattless current is produced. If the current and the voltage can be kept substantially in phase over the entire line, the line voltage will remain substantially constant, which is one of the ultimate objects desired.

In the practical application of my invention, I contemplate providing synchronous regulators or corrective loading devices at suitably spaced points along the transmission line to supply leading or lagging current, as required. I also utilize, in conjunction therewith, the capacity currents of the line and such other corrections as arise from the use of synchronous motors in the power load. The synchronous regulators may be distributed along the line at suitable intervals, such as at every 100 to 200 miles, and largely at load centers where the distance between such centers is not too great. A very satisfactory and the preferred type of synchronous regulator is the synchronous condenser.

Moreover, in the event of a loss or failure of one condenser, the step-down transformers may be of such design as to inherently hold down the line voltage to a desirable value, in addition to the stabilizing action of the adjacent condenser stations.

Referring to the accompanying drawings, the diagrams show application of my invention to any long-distance high-voltage transmission line or even a super-power-development system for supplying electrical energy at a relatively low cost to substantially the entire area of the country:

Fig. 1 is a diagrammatic view of a long distance high-voltage transmission line embodying a plurality of regulating stations constructed and connected in accordance with my present invention;

Fig. 2 is a simplified diagrammatic view of a transmission system in which my invention has been embodied;

Fig. 3 is a diagrammatic illustration of a similar system showing a certain network of lines;

Fig. 4 is a vector diagram illustrating the principles of operation;

Fig. 5 and Fig. 5$^A$ are respectively a schematic illustration of a simple transmission line and a diagram of the corrections to be applied thereto, and Fig. 6 is a more complete type of diagram showing the principles of operation of my invention.

The invention is applicable to any long-distance high-voltage transmission lines or networks, or even to a high-voltage network extending across the whole United States that has been properly located with respect to various hydro-electric and steam generating stations, either present or proposed, whereby the power requirements for the various centers of distribution and manufacture throughout the country, as well as the transcontinental and other railway lines, may be satisfactorily and economically supplied. Two of the well known smaller power developments that have already been considered in more or less detail are the Niagara-New York and St. Lawrence River power system projects. However, my invention is readily applicable not only to such systems but even to the transcontinental transmission of power at a relatively low cost, whereby various industries may be located at the most economically suitable points, and a reliable source of constant-potential energy will be available from some point not far removed.

As previously stated, the extensions and interconnections of my long-distance or even transcontinental transmission system will not be limited or handicapped in any way by electrical or operating difficulties but may be determined solely on the basis of industrial economy and the ability to make a profitable investment.

Reference may now be had to Fig. 1, wherein the system shown comprises a transcontinental or other relatively long-distance transmission line, preferably of the three-phase type, embodying conductors 1, 2 and 3, which may be supplied at various points from suitable steam or hydraulically driven generator stations, which are regulated for constant voltage, one of which is indicated at G.

At uniformly spaced points along the system, such, for example, as every 100 miles, synchronous condenser substations 4 are connected across the line.

Each sub-station may comprise a suitable step-down transformer 5 having a star-connected primary winding with its neutral point grounded for stabilization purposes, as previously set forth; a synchronous condenser 6, which is connected through the transformer 5 to the transmission line; an exciter 7 and a regulator 8 for automatically regulating the operation of the synchronous condenser in accordance with the demands of the transmission line.

The exciter 7 is connected, through a suitable variable resistor 11, to the exciting field winding 10 for the synchronous condenser 6, while a suitable regulator, conventionally illustrated at 8, is shown as being responsive to the voltage across one phase of the synchronous condenser for so controlling the series resistor 11 and a second resistor 12, which is connected in parallel relation to the field winding 10, as to automatically over-excite or under-excite the field winding to maintain the desired constant voltage under all conditions upon the transmission line.

The particular type of regulator to be employed is not relevant to the present invention and any suitable regulator for automatically over-exciting and under-exciting the field winding, as desired, may be employed. As examples of such a regulator, reference may be had to Tirrill Patent No. 1,192,708, which was granted July 25, 1916, and to a copending application of H.

A. Travers, regulator systems, Serial No. 540,178, filed March 1, 1922, and assigned to the Westinghouse Electric & Manufacturing Company.

Referring particularly to the diagram of Fig. 4, let the receiver voltage, which should be 100%, be illustrated by the line $o, a$. Then the reactance pressure, or voltage necessary to drive a unity-power-factor load current through the impedance of the line, will be indicated by $a, a'$ at right angles thereto, without resistance loss, and with resistance loss by $a, b$, and the direction of the line voltage, or voltage necessary to overcome the line impedance, under ordinary practice for a lagging current is shown by $a, f$. If the line is loaded with a leading or charging current or capacity current, the line voltage may be deflected toward approximately the position $a, g$, which is the ideal condition desired. It is, therefore, very desirable that the line voltage lie as nearly as possible along the arc $a, g$ for all conditions of load, i. e. light or full loads. If a synchronous regulator or condenser is placed at the receiver end, the line voltage may be prevented from taking the direction $a, f$, and may be kept along the circle $a, g$, provided the line current be kept in phase with or slightly in advance of the pressure. In Fig. 4, the line $f, b$ represents the voltage correction by the synchronous condenser for the power-factor of the load $b\ a'$ represents the voltage correction by the synchronous condenser for the resistance drop, and $a', g$ represents the correction by the charging current and the synchronous condenser to make all points of the line have approximately the same voltage. The line-charging current for a 220,000 volt line transmitting about 150,000 kw. supplies the capacity current required for about ¾ load. The synchronous condenser draws a leading current for larger loads and a lagging current for smaller loads to maintain the voltage practically constant for all points of the line transmission.

Since for loads smaller than that for which the charging current corrects for the voltage drop, the synchronous condenser draws lagging curent, this correction below this load may be effected by variable stationary reactances instead of a synchronous condenser. For light loads or for no load, the synchronous condensers supply part or all of the charging current required for the line, thus relieving the generating stations of this burden and giving them always a load current near unity power factor.

In Fig. 5, the regulation is for a simple 300-mile line. A synchronous condenser $SC_x$ at the receiver end corrects for the power-factor at the receiver end of the line, and for some of the resistance drop, and another or intermediate synchronous condenser $SC_2$ and the line-charging current correct the voltage for the remaining resistance and reactance drop.

In Fig. 2, a wiring diagram for a line about 500-miles long is illustrated, in which loads are taken from the line at three intermediate points, the current from a generator 21 being conducted through a step-up transformer 22 to line wires 23 and 24. At the end of the first 100 miles, a step-down transformer 25, having two low-voltage windings 26 and 27, is connected, through one of the low-voltage windings, to a synchronous condenser $SC_1$, and the other low-voltage winding is connected to either a load or generator $L_1$. Similar installations are provided at the ends of the second, fourth, and last 100-mile sections through transformers 28, 29 and 30, respectively, synchronous condensers $SC_2$, $SC_4$ and $SC_5$ and loads or generators $L_2$, $L_4$ and $L_5$. At the end of the third section, a transformer 31 is provided for the synchronous condenser $SC_3$. Loads may be supplied to or taken from the line at any of the points $L_1$, $L_2$, $L_4$ or $L_5$.

In Fig. 3, a similar system is illustrated, but the line wires are arranged in a web or net-like manner to illustrate that, with the voltage regulation problem successfully solved, the country could be covered with a network of transmission lines with power supplied to, or taken from, the system at any desired points. In fact, the power flow might be in one direction upon one portion of the line and in an opposite direction in another portion of the line or in opposite directions over the same line at different times. In the system of Fig. 3, two generating stations G and H are shown as adapted solely to supply power to the lines. Power may be supplied to or taken from the lines at stations A, B, C, E and F, and the regulation of voltage accomplished not only by the capacity currents of the line, but by the synchronous condensers. The synchronous condensers might be said to "tie down" the voltage points of the system. Any tendency to raise or lower the line voltage is instantaneously and at least partially counteracted by the condensers—in this respect acting like "electric gyroscopes", or automatic magnetic brakes acting against variations of voltage. The voltage being constant there is a gradual decrease of current along the line to make up the dissipated energy of the line.

The diagram shown in Figs. 4 and 5A are illustrative and approximate, and are given for the purpose of a general understanding of the transmission system proposed. Consider a system of four sections of 100 miles each, a synchronous condenser $SC_1$, etc. being located at the end of each section (the sections for calculation as per diagram in Fig. 2 really begin and end at the condensers). In practice, of course, the distances between condenser stations may be varied to meet the distances best suited for economy for particular conditions. For example, the transformer and condenser stations would be located generally near cities or large load centers and the spacings may vary to some extent, but this can be taken care of by the capacity of the condensers.

In Fig. 6 is shown a more accurate diagram of the load end of a 100-mile section of a constant-potential transmission system. Voltage and current are plotted to the right from O—O, the voltage being that between one line conductor and ground or neutral, and the current being the load current at the end section. The resistance per 100-mile section is taken as 9 ohms, the reactance 80 ohms and the charging current 70 amperes. These values are for a 60-cycle line. The voltage to neutral is 127,000 volts and the full-load current I=500 amperes. At E=100%, lay off vertically $$oa = IX = 500 \times 80 = 40000 \text{ volts} = 31.5\%.$$

Lay off from $a$ the length $$ab = IR = 500 \times 9 = 4500 \text{ volts} = 3.54\%.$$

Draw now the circular arc $og$, which is the locus of the ends of the voltage vectors which are to be maintained practically constant.

It will be seen that the voltage $bg$ must be compensated for in some way to keep the voltage constant. There are two means for correcting this drop $bg$, one being the charging current of the line and the other the leading current (below the point $a'$ or about 0.4 load the condenser current would be lagging) of the condenser. The correction of voltage given by the charging current $I_c$ is $\frac{I_c X}{2} = hg$ on the diagram. Hence, the remaining correction $bh$ must be made by the synchronous condenser current, $I_{sc}$, and must equal $I_{sc}X$. Now $$bg = bh + hg = ba + ag.$$

We know that $ba = IR$, and from the figure it can be proved by simple trigonometry that $$ag = \frac{I^2 X^2}{2E},$$

approximately. Hence we have $$I_{sc}X + \frac{I_c X}{2} = IR + \frac{I^2 X^2}{2E}$$

and $$I_{sc} = \frac{IR}{X} + \frac{1}{2}\left(\frac{XI^2}{E} - I_c\right),$$

the envelope of the current vectors $I_{sc}$ drawn for various fractional loads being shown by the curve $o\ i\ j$.

The envelope of the vectors for the currents at the beginning of this 100-mile section for different fractional loads is shown by the curve $k\ k'\ e$. The figure shows the current and power-factor conditions from no load to full load.

At no load, it is shown that the condenser at the load end supplies charging current for 50 miles of line and the other stations furnish the charging current for 100 miles on each side of the condenser, and the generating station need not supply any charging current, in which case there would be no current supplied by the power station. It will generally be economical for the generating station to supply the charging current for the first line section. The power-factor of the condensers is practically zero, and current in the condensers is lagging with respect to the line voltage. As the load increases, the synchronous condenser absorbs less charging current to hold the voltage constant. At about two-thirds load, as shown, the current is made to lead by the first condenser current, and the charging current of the line rotates the current still more, until, at the end of the line section, the current leads the pressure by the angle shown, $\theta\frac{2}{3}$. This is about the same angle that the current was made to lead by the end condenser, and hence we see that, for this load, all the condensers except the end condenser would not be supplying leading or lagging current. Hence, for this load, the line is practically self-regulating, if we have unity-power-factor load.

As the load still further increases, we see that the condensers must furnish more leading current, as shown by the point $j$, and the line-charging current rotates the current still further to the position $o, e$. The power factor from about one-half load to full load, in which range the system will normally operate, is very good indeed, being near unity. The power-factor of the line and at the generator can thus be controlled closely enough for all practical purposes to give high economy and maintain practically a constant potential for all points of the transmission line, no matter how long it may be.

It will be seen that the potential phase difference between the ends of 100 mile sections will be, at full load, about 18°, and proportionally for smaller loads. For a 500-mile line this means a phase rotation of the pressure at full load of about 90°, and 180°, for a 1000-mile line. It is thus seen to be absolutely necessary that the current be made to rotate through approximately the same angle as the pressure is rotated in order to obtain a power-factor substantially near unity when the system is carrying a normal duty.

It is not necessary that the current be kept in exact phase with the pressure, but it must vary to some extent from this exact position for different load conditions, as shown in the diagram, which has been made to meet the condition of constant voltage. Maintaining constant voltage gives the same service at different points on line and the power factor becomes, of necessity, very good.

The natural periodicity of the line is determined by the length of the line sections between the synchronous condenser stations and thus the natural periodicity of a 500 or 1000-mile line may be the same if the voltage at the intermediate points is "held down" by synchronous condensers or synchronous regulators as that of a line having a length equal to the line sections. The rise in voltage over the line due to the charging current is thus determined by the length of the line sections and not by the total length of the line. Otherwise, without the synchronous regulators added, we would get uncontrollable voltage conditions making long lines inoperative. In fact, the proposed system acts as though there were automatic regeneration at each of the synchronous-regulator stations.

It will be seen that my system of transmission automatically regulates the operation of the uniformly spaced synchronous condensers to maintain a substantially constant voltage throughout the length of the line by supplying the wattless power taken by the line itself. In this way the reactance of the line is substantially eliminated, and the transmission losses are limited to resistance and leakage losses only. By providing the relatively short sections connected in series relation, the line inherently possesses stable characteristics under all operating conditions and, while the voltage is maintained substantially constant, the differences in the power-factors between the generating and the receiving ends is materially reduced over prior-art transmission systems.

Furthermore, the sections of the transmission line constitute but a small fraction of the wave length corresponding to the frequency of the transmission system, which, in the present case, may be assumed as 60 cycles, although the total length of the system may be an appreciable fraction of a wave length or may even exceed a wave length. It will be understood that, in case a relatively high frequency were employed, my invention would be applicable to a much shorter transmission line than the proposed transcontinental line is employed, such, for example, at a relatively short branch thereof. The same effects and results would be obtained in this high-frequency system and a corresponding reduction in the spacing of the synchronous condenser sub-stations would be required. In other words, the fact that the total length of the line is an appreciable fraction of the wave length corresponding to the normal frequency of the line is an important feature of the present invention.

It will be seen that such a national power system will make the best possible use of the potential power sources of the country, because the system will be so large as to make best use of the varying stream characteristics in the various sections. Such a system will also derive advantage from the time differences or shifts in daylight hours between the East and the West by reason of the differences in time of the peak loads on the system. It will also take best advantage of the diversity of interests in the various sections of the country.

Such a system of electric-power transmission is necessary for the economic development of this country. For, aside from the economics of such a system in connecting up the surplus power sources with the large consuming markets and in bringing into use many power sources otherwise not feasible of development, such a system will bring about a distribution of the industries and population of the country not otherwise possible, resulting in adding to the general stability of the country.

Heretofore it has been proposed to employ synchronous condensers, or other wattless current generating means, in terminal or other local circuits on a transmission line, to steady or regulate the voltage in such local circuits, and sometimes to hold it equal with the voltage at the generator end of the line; and for such purpose it has been proposed that the rating and regulation of such synchronous condensers be proportioned to the regulation requirements of the local load on the local circuits in which such condensers were respectively to be employed. But heretofore it was never proposed that a long-distance transmission line be intercepted by synchronous condensers, or other wattless current generating means, having their rating and regulation proportioned to and adequate for regulation of the line itself in respect of through trunk-line blocks of power to be transmitted through such intercepting points and onward to points beyond along the line, as well as in respect of whatever power is drawn off or supplied to the trunk-line by local circuits at or near such intercepting points. Neither was it ever proposed that such trunk-line regulating stations be so distributed as to intercept the line within the limits beyond which substantial instability would otherwise inherently occur in attempting through transmission of such blocks of power along such line and to the load circuits on it. Neither was it ever proposed that such trunk-line regulating synchronous condenser stations be so distributed as to intercept such line within limits that would sectionalize it into sections whose natural periodicity would be so high that the sectionalized line would not be subject to the serious transmission obstacles inherent in the low natural periodicity the same long line unsectionalized would have. Neither was it ever proposed that such synchronous condenser stations so distributed have such rating and regulation as to be adequate to carry the charging current of such trunk-line and relieve the burden thereof otherwise imposed on the generators and at the same time cooperate effectively with the charging current so as to utilize it fully for control of the line itself without the menace such charging current otherwise became during, for instance, sudden disconnection of heavy load or opening of receiver station circuit-breakers. Neither was it ever proposed that such synchronous condenser stations, having such rating and regulation and so distributed, be employed essentially as props for the trunk-line voltage, so to sustain and so to restrain it that power transmission may be effected up to substantially the carrying capability of the line itself, and not just within the receptivity limitations set by the mere local regulation requirements in local circuits, and so render through power transmission substantially independent of all but resistance and leakage losses and give to the long compound line the effectiveness of a short line and make the length substantially unrestricted, save by the economic value of the power delivered at points distant from its source. These purposes are effected by the present invention. Its primary consideration is the control of the through trunk-line itself and making that line-control dominant over whatever local regulation is employed in power-supply or load circuits on the line, such mere local regulation being contradistinguished by the fact that its requirements are determined by the limitations of the local load in the local circuit and that its extent and purpose are mainly just the local voltage steadying that betters the receptivity of the local circuit with only incidental benefit to the through line and without providing such line with regulation adequate for through transmission of large blocks of power over and above the power drawn off or added to the trunk-line by the local circuits along it.

The compound line, constituted of the transmission line and its synchronous condensers, and with the connected local circuits and whatever local regulation they employ, differs essentially from a simple or normal long line, constituted of the same transmission line without the synchronous condensers, and with the same connected local circuits and their local regulation. The compound line overcomes line difficulties that become inherent when the simple or normal line is sought to be extended to distances beyond the limits of what is ordinarily termed a short line, and difficulties that become insuperable at great distances. In the short line, with its connected local circuits, the total electrical length is only such fractional part of the fundamental wave length of the impressed alternating electromotive force that the inherent capacity or charging current is either negligible or too small to materially affect the transmission of, and therefore be comparable with, the power component of the load current; and that the natural periodicity of the line is too high to permit resonance oscillations or like disturbances great enough to interfere materially with practical high-voltage transmission; and that the inherent inductance of the line is not great enough to occasion instability at or before the receiver circuits. In the aforesaid long simple or normal line, with its connected local circuits, the capacity or charging current is inherently of an order of magnitude that must be reckoned with and becomes of practical moment worthy to rank with, and therefore be comparable to, the power component of the load current; and the short-circuit current may become small; and the natural periodicity of the line becomes low enough to permit resonance oscillations or like disturbances that interfere with or defeat practical high-voltage transmission; and the inductive reactance of the line is much greater than its resistance; and the electrical length of such line becomes great enough to occasion or practically threaten instability at or before the receiver circuits, such instability becoming a practical risk, under the ordinary normal variations of the operating conditions and load, long before the electrical length of the line reaches the theoretical limit at which under even normal steady conditions the voltage displacement would attain the angle of nearly ninety degrees at which instability inherently must occur. Such long simple or normal line is the line whose transmission difficulties are remedied by the compound line of this invention. The need for it of course does not merely arise at the abstract theoretical limit beyond which appreciable power cannot be transmitted over the simple line, but arises practically where the limitations of the simple line transmission reduce the transmissible power either below a practical economic limit or to less than the practical economic value of installation and operation of the compound line. Effective operating limits must of course be those within which practically useful power is deliverable on a practicable economic basis, and the increase of such effectiveness is a main utility of the compound line in long-distance power-transmission.

The wattless current generating means employed in the compound line are preferably synchronous condensers, because especially suited and practical for the wide range of fluctuations in line conditions to be controlled and because of their quick and effective response to regulation, but loaded synchronous motors or generators or other operating or even static reactors may be employed if designed to do the work of controlling such wide range of fluctuations in line conditions and to respond quickly and effectively to the automatic regulation that such control of the line itself requires. Unless synchronous motors or generators are so designed, they are not, even though running idle, properly termed synchronous condensers, as they are not ordinarily capable of having the range or character of regulation that obtains in machines that are primarily synchronous condensers or synchronous phase modifiers.

The wattless current generating means may sometimes be termed a reactor, in the broad sense in which that term is employed to indicate a device used primarily because it possesses the property of reactance, and used in the line for purposes of control effected by inductive and condensive reactance.

I do not wish to be restricted to the specific circuit connections or arrangement of parts herein set forth, as various modifications thereof, such as changes in the voltage and frequency employed and the preferred spacing of the synchronous condensers, may be effected without departing from the spirit and scope of my invention. I desire, therefore, that only such limitations shall be imposed as are indicated in the appended claims.

I claim as my invention:

1. A long-distance high-voltage power-transmission system comprising: a line connected to power-supply and load circuits and extended beyond the normally inherent stability limits of distance for such a line so connected; and wattless-current generating-means intercepting said line within said stability limits and having such rating and regulation as to be adequate to carry the charging current and control the voltage along the line itself and to maintain the stability of the system for through power-transmission along the line from no load to peak load, such line-regulation for through transmission being dominant over whatever local regulation is employed in power-supply or load circuits on the line.

2. A long-distance high-voltage power-transmission system comprising: a line connected to power-supply and load circuits and extended beyond the normally inherent stability limits of distance for such a line so connected; and a synchronous condenser or synchronous condensers intercepting said line within said stability limits and having such rating and regulation as to be adequate to carry the charging current and control the voltage along the line itself and to maintain the stability of the system for through power-transmission along the line from no load to peak load, such line-regulation for through transmission being dominant over whatever local regulation is employed in power-supply or load circuits on the line.

3. A long-distance power-transmission system constituted of line units connected in series and having at their junction point or points wattless-current generating-means operating by inductive and condensive reactance to compensate leading and lagging currents and, in cooperation with the charging current of the line, to maintain within a controlled effective range the voltage along the line units extending in each direction from such junction point or points respectively, said wattless-current generating-means respectively having such rating and regulation as to be effectively responsive to fluctuations in line-conditions inherent in and distributively occurring along said line units and be adequate to carry the charging current of the line and control the line itself, such line-regulation for through transmission being dominant over whatever local regulation is employed in power-supply or load circuits on the line, and said line units extending away from said wattless-current generating-means respectively for distances of like order of magnitude and each within that distance beyond which substantial instability inherently occurs in such a line, the natural period of oscillation of each of said units so controlled being substantially greater than the fundamental frequency, the line being one whose charging current is of an order of magnitude comparable to the power component of the load current of the line, and the inductive reactance of the line being of an order of magnitude substantially greater than the resistance of the line; whereby the wattless-current generating-means serve essentially as an intermediate prop or intermediate props so to sustain and so to restrain the voltage along the line itself as to provide stable effective transmission of power throughout the line.

4. A high-voltage power-transmission system of unrestricted length provided, at a point or points in advance of the region or regions of normal instability of the line, with line-regulating means for preventing the occurrence of such instability, such line-regulation for through transmission being dominant over whatever local regulation is employed in power-supply or load-circuits on the line.

5. A high-voltage power-transmission system of unrestricted length comprising a plurality of units in series, each unit corresponding in length to a short line and being provided with means at its terminal cooperating with said unit to substantially maintain the line voltage regulated at effective power transmitting value, such line-regulation for through transmission being dominant over whatever local regulation is employed in power-supply or load circuits on the line; whereby each unit will operate to deliver the power as an original source into the next succeeding unit, and the long line will possess throughout its length substantially the power-transmitting effectiveness of a short line.

6. An electrical power-transmission system comprising a transmission line of such length, voltage and frequency that the charging current thereof normally causes substantial increases in voltage at points remote from the source of power under light or no-load conditions and the inherent inductive reactance thereof substantially limits the amount of power that can be transmitted, a plurality of generating stations feeding power into the said line, a plurality of load stations receiving power from said line, a plurality of synchronous condensers connected to the line at intervals, and means for automatically regulating said condensers in accordance with the voltage of the line itself so as to maintain said line voltage regulated within a desired range of variation in which the highest voltage does not exceed a predetermined operating value and the lowest voltage permits of the transmission throughout the length of the line of substantially the power delivered to it, such line-regulation for through transmission being dominant over whatever local regulation is employed in power-supply or load circuits on the line.

7. The method of operating an electrical power-transmission line of such length, voltage and frequency that the charging current thereof normally causes substantial increases in voltage at points remote from the source of power under light or no-load conditions, which consists in supplying reactive volt-amperes to the line at a plurality of distributed points therein and in so varying the amount and character of the reactive volt-amperes supplied to the line at each of said distributed points as to maintain the voltage of the line itself at said points substantially uniform and equal under all conditions of load, such line-regulation for through transmission being dominant over whatever local regulation is employed in power-supply or load circuits on the line.

8. A power system comprising an electrical transmission line and a synchronous condenser, to regulate the line itself, connected to the line intermediate and remote from the points where energy is supplied to the line and where energy is taken from it respectively, such line-regulation for through transmission being dominant over whatever local regulation is employed in power-supply or load circuits on the line.

9. A long-distance electrical power transmission system comprising a through transmission line, a plurality of local circuits connected to points at intervals on said line through suitable transforming apparatus, dynamo-electric machinery located in each of said local circuits and having rating and regulation adequate to hold the voltage substantially constant for all power transmitted to or from their respective local circuits, and a plurality of devices connected to said line at one or more of such points for supplying reactive volt-amperes to, and withdrawing reactive volt-amperes from, the aforesaid transmission line, one or more of said local circuits exchanging a relatively small amount of power with said line as compared to the amount of power transmitted by said line itself to points beyond on said line.

10. The method of transmitting power over an electrical power transmission line of such length, voltage and frequency that its inherent inductive reactance substantially limits the amount of power that can be transmitted, which consists in supplying to the line itself at an intermediate point thereof a sufficient rated flow of reactive volt-amperes to maintain the line-voltage at said point within a predetermined range and enable the line itself to transmit beyond said intermediate point a block of power substantially exceeding the limit imposed by the original characteristics of the line and irrespectively of the load carried at any intermediate point in the line.

11. A long-distance power-transmission line provided with reactors at the receiving point and at an intermediate point, said reactors having a rating and regulation adequate to control the voltage at said points within such predetermined range that the total reactive volt-amperes required to be delivered to the line itself per unit of power transmitted at a given load is substantially less than would be required for the same line regulated by similar reactors located at the receiving point only to give at said point the same predetermined range of voltage at the same load, within the limits of stability of said line, such line-regulation for through transmission being dominant over whatever local regulation is employed in power-supply or load circuits on the line.

12. A high-voltage power-transmission line of unrestricted length provided with a generator and a receiver at its respective ends and constituted of line units connected in series and having at their junction points reactors to carry the charging current and supply the inductive requirements of the line, said reactors having such rating and regulation that at the limit of stability of the compound line the angle between the generator and receiver voltages is substantially greater than the angle between the voltages at any two junction points at the limit of stability of transmitted load between said junction points.

13. An electrical system comprising a transmission line of such length, voltage and frequency that the charging current thereof normally causes substantial increases in voltage at points remote from the source of power under light or no-load conditions and the inherent inductive reactance thereof substantially limits the amount of power that may be transmitted, a generating station and a load station connected to different points thereof, and a synchronous condenser connected to the line intermediate said stations and of such rating and regulation as to regulate the line itself and permit the transmission from said generating station to said load station of power required thereby above the operative limit imposed by the electrical characteristics of the system as otherwise constituted, such line-regulation for through transmission being dominant over whatever local regulation is employed in power-supply or load circuits on the line.

14. In a long-distance power-transmission system, the combination with the line wires thereof, of a voltage controlling device or devices located at a point or points respectively along the line, the lengths of the line sections marked out and regulated by said device or devices being such that the natural periodicity of each of said sections is substantially higher than that of the fundamental transmitted waves, such line-regulation for through transmission being dominant over whatever local regulation is employed in power-supply or load circuits on the line.

In witness whereof, I hereunto subscribe my signature.

FRANK G. BAUM.

CERTIFICATE OF CORRECTION.

Patent No. 1,617,007.  Granted February 8, 1927, to

FRANK G. BAUM.

It is hereby certified that error appears in the printed specification of the above mentioned patent requiring correction as follows: Page 1, line 4, after the word "distances" strike out the period and insert a comma and the words "this application being a continuation in part of my copending application, Serial No. 500,563, filed September 14, 1921."; and that the said Letters Patent should be read with these corrections therein that the same may conform to the record of the case in the Patent Office.

Signed and sealed this 15th day of March, A. D. 1927.

Seal.

M. J. Moore,
Acting Commissioner of Patents.